United States Patent [19]

Talley

[11] Patent Number: 4,645,787

[45] Date of Patent: Feb. 24, 1987

[54] FLAME RETARDANT POLYPHENYLENE OXIDE THERMOPLASTICS

[75] Inventor: John J. Talley, Clifton Park, N.Y.

[73] Assignee: General Electric Company, Schenectady, N.Y.

[21] Appl. No.: 751,096

[22] Filed: Jul. 2, 1985

[51] Int. Cl.⁴ .................. C00K 5/42; C00K 5/49; C00K 5/51

[52] U.S. Cl. .................. 524/122; 524/137; 524/157; 525/68; 525/905

[58] Field of Search ............... 524/166, 122, 137, 157

[56] References Cited

U.S. PATENT DOCUMENTS 4,529,761  7/1985  Lohmeijer .................. 524/166

Primary Examiner—Jacob Ziegler
Attorney, Agent, or Firm—William A. Teoli; James C. Davis, Jr.; James Magee, Jr.

[57] ABSTRACT

Thermoplastic flame retardant compositions of polyphenylene oxide and styrene are provided exhibiting superior resistance to stress cracking.

5 Claims, No Drawings

FLAME RETARDANT POLYPHENYLENE OXIDE THERMOPLASTICS

CROSS REFERENCE TO RELATED APPLICATIONS

Reference is made to my copending application Ser. No. 651,542, filed Sept. 17, 1984, now U.S. Pat. No. 4,593,058, for Flame Retardant Polyphenylene Oxide Thermoplastics, assigned to the same assignee as the present invention and incorporated herein by reference.

BACKGROUND OF THE INVENTION

Prior to the present invention, as shown by Cizek U.S. Pat. No. 3,383,435, assigned to the same assignee as the present invention and incorporated herein by reference, thermoplastic resin compositions were provided comprising a polyphenylene ether and a styrene resin. Other thermoplastic compositions are shown by Izawa et al., U.S. Pat. Nos. 3,929,930 and 3,929,931, incorporated herein by reference, which are polyphenylene ether having polystyrene grafted onto the backbone. Although these materials in the form of shaped articles have high impact strength, stiffness, good surface appearance, heat resistance and other desirable properties during or after molding, a major shortcoming of these materials as thermoplastics resins is their normally flammable nature. As a result, flame retardant and/or drip retardant agents are commonly incorporated into such blends of polyphenylene ethers and styrene resin prior to molding.

The flammability of normally flammable thermoplastic polymers have been reduced by using antimony-, halogen-, phosphorous- or nitrogen-containing additives commonly referred to as flame retardant agents. For example, aromatic phosphates such as triphenylphosphate or a combination of such compounds with other compounds such as halogenated aromatics have been added as flame retardant agents as shown by Haas, U.S. Pat. No. 3,639,506. Experience has shown, however, that although these phosphate compounds have been found to impart good flame resistant properties to such polyphenylene ether thermoplastic blends, physical properties of the molded blends such as the heat distortion temperature (HDT) are often adversely affected.

In my copending application Ser. No. 651,542, there is taught that the addition of a small amount of an organothiophosphate, for example, a triarylthiophosphate, to polyphenylene oxide-polystyrene resin blends, or grafted copolymers thereof, significantly reduces the flammability of the resulting molded thermoplastic materials. However, it has been found that even though improved flame retardant properties can be achieved by using an effective amount of an organothiophosphate in polyphenylene oxide blends, the resulting flame retardant compositions exhibit a significant degree of stress cracking after heating aging the molded composition. As defined hereinafter, the term "stress cracking" means the formation of small hairline cracks along the edges of a molded thermoplastic part. It results from stresses created due to variations in the cooling rate of different areas of the molded part after the part is released from a mold. In measuring stress cracking, the thermoplastic is molded to a 22"×7¾"×2" tub shaped container having ⅛" thick walls. The presence of small cracks in centimeters near the edges is determined by optical microscopy.

As shown by Lohmeijer, U.S. Pat. No. 4,529,761, polyphenylene oxide compositions, having both improved flame retardant and stress cracking resistance, can be obtained by using aromatic phosphates, such as triphenylphosphate, with a mixture of certain alkali metal salts of alkyl sulfonates. Although improved stress cracking can be achieved utilizing the aforementioned combination, the resulting flame retardant polyphenylene oxide composition nevertheless shows some degree of stress cracking. It would be desirable to obtain flame retardant polyphenylene oxide compositions substantially free of stress cracking.

The present invention is based on my discovery that the addition of a small amount of an alkali metal salt of a $C_{12}$ to $C_{18}$ alkyl sulfonate having the formula, $$(RSO_3)_n M, \tag{1}$$

where R is an aliphatic radical, and preferably a polymethylene radical having from 12 to 18 carbon atoms, and n is an integer equal to 1 or 2, and when n is 1, M is sodium or potassium, and when n is 2, M is calcium or magnesium. These sulfonate salts, referred to hereinafter as "metal alkyl sulfonate" or "metal alkyl sulfonates" when used in combination with an effective amount of triarylthiophosphate in polyphenylene oxide-styrene blends or graft copolymers thereof can provide high performance thermoplastic molding compositions. The resulting compositions exhibit improved flame retardance and are substantially free of stress cracking as compared to moldable polyphenylene oxide styrene resin compositions of the prior art.

STATEMENT OF THE INVENTION

There is provided by the present invention, flame retardant thermoplastic molding compositions of polyphenylene oxide and styrene resin, or graft copolymers thereof, comprising by weight (A) 100 parts of polyphenylene oxide
(B) 20 to 300 parts of styrene resin,
(C) an amount of organothiophosphate having the formula, $$(R^1O)_2\overset{\overset{\displaystyle S}{\|}}{P}-Q, \tag{2}$$

which is sufficient to provide from 0.5% to 5% by weight of phosphorous based on the weight of the flame retardant thermoplastic composition and (D) an effective amount of metal alkyl sulfonate,
where $R^1$ is a $C_{(1-13)}$ monovalent hydrocarbon radical or substituted $C_{(1-13)}$ monovalent hydrocarbon radical, Q is a monovalent group selected from $-OR^1$ and $$-O-R^2-O-\overset{\overset{\displaystyle S}{\|}}{P}-(OR^1)_2,$$

and $R^2$ is selected from divalent $C_{(2-20)}$ hydrocarbon radicals and substituted divalent $C_{(2-20)}$ hydrocarbon radicals.

Radicals included within $R^1$ of formula (1) are, for example, $C_{(1-8)}$ alkyl radicals such as methyl, ethyl, propyl, butyl, pentyl, hexyl, etc.; $C_{(6-13)}$ aryl radicals such as phenyl, tolyl, xylyl, naphthyl, and $C_{(1-8)}$ alkoxy and halogenated derivatives of such aryl radicals. Radicals included within $R^2$ are, for example, alkylene radicals such as dimethylene, trimethylene, tetramethylene, hexamethylene and branched alkylene radicals; arylene radicals such as phenylene, toluene, xylylene, and divalent radicals having the formula $$-R^3(X)_a X^1-$$

where $R^3$ is a divalent $C_{(6-13)}$ arylene radical, X is a divalent radical selected from O, S and $C_yH_{2y}$, $X^1$ is selected from $R^3$ radicals, y is a whole number from 1 to 5 inclusive, a is 0 or 1, and when a is 0, the sum of the carbon atoms in $R^3$ and $X^1$ is the same as $R^3$.

Some of the organothiophosphates which are included within formula (1) are, for example, triphenyl thiophosphate, tri o-cresyl thiophosphate, tri m-cresyl thiophosphate, tri p-cresyl thiophosphate, trixylyl thiophosphates, tris-trimethylphenyl thiophosphates, trimethyl thiophosphate, triporpyl thiophosphate, phenyldimethyl thiophosphate, tri-p-chlorophenyl thiophosphate and the like.

The polyphenylene ether or polyphenylene oxide resin which can be used in the practice of the present invention is shown by the following formula

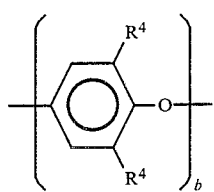

(3)

where $R^4$ is a monovalent radical selected from the class consisting of hydrogen, halogen, hydrocarbon radicals free of a tertiary α-carbon atom, halogenated hydrocarbon radicals having at least two carbon atoms between the halogen atom and the phenyl nucleus, hydrocarbonoxy radicals and halogenated hydrocarbonoxy radicals having at least two carbon atoms between the halogen atom and the phenyl and b is an integer having a value of at least 50.

A more preferred class of polyphenylene ether resins for the compositions of the present invention include those of formula (3) where $R^4$ is alkyl and, most preferably, having from 1 to 4 carbon atoms. Illustratively, members of this class include poly(2,6-dimethyl-1,4-phenylene)ether; poly(2,6-diethyl-1,4-phenylene)ether; poly(2methyl-6-ethyl-4-phenylene)ether; poly(2-methyl-6-propyl-1-4-phenylene)ether; poly(2,6-dipropyl-1,4-phenylene)ether; poly(2-ethyl-6-propyl-1,4-phenylene)ether; and the like.

Especially preferred is poly(2,6-dimethyl-1,4-phenylene)ether, preferably, having an intrinsic viscosity of about 0.45 deciliters per gram (dl./g.) as measured in chloroform at 30° C.

The preparation of the polyphenylene ether resins is described in Hay, U.S. Pat. Nos. 3,306,874 and 3,306,875 and in Stamatoff, U.S. Pat. Nos. 3,257,357 and 3,257,358, which are incorporated herein by reference.

The preferred styrene resins are those having at least 25% by weight of repeat units derived from a vinyl aromatic compound of the formula:

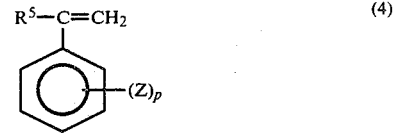

(4)

where $R^5$ is selected from hydrogen, $C_{(1-5)}$ alkyl and halogen, Z is selected from vinyl, hydrogen, halogen and $C_{(1-8)}$ alkyl, and p is a whole number equal to 0 to 5 inclusive.

The term "styrene resins" is used broadly to define components fully described in Cizek, U.S. Pat. No. 3,383,435, the disclosure of which is incorporated herein by reference Such resins include homopolymers, such as polystyrene, polychlorostyrene and polyvinyl toluene, the modified polystyrenes such as rubber modified polystyrene blended or grafted high impact products, e.g., the rubber being a polybutadiene or an elastomeric copolymer of styrene and a diene monomer. Also included are styrene containing copolymers, such as styrene-acrylonitrile copolymers (SAN), styrene-butadiene copolymers, styrene-acrylonitrilebutadiene terpolymers (ABS), styrene-maleic anhydride copolymers, polyalpha-methylstyrene, copolymers of ethyl vinyl benzene and divinylbenzene, and the like. In instances where the method of Izawa et al. is used to make thermoplastic materials, U.S. Pat. Nos. 3,929,930 and 3,929,931, polyphenylene oxide is heated with a styrene monomer shown by formula 4 in the presence of a free radical initiator resulting in a graft polyphenylene ether polystyrene copolymer.

Special mention is made of a preferred class of styrene containing resins. These are known as "HIPS" resins, for high impact polystyrenes, in which the impact modifier comprises one or more of an ethylene/propylene/diene terpolymer, or a hydrogenated derivative, a vinylaromatic/diene block copolymer resin, or a hydrogenated derivative, a hydrogen saturated vinylaromatic/diene random copolymer, a radial teleblock copolymer of a vinyl aromatic compound and a diene, a vinyl aromatic/methacrylic or acrylic acid or ester/diene terpolymer, and the like. These specialty HIPS resins are commercially available or can be prepared by those skilled in this art.

The compositions of the invention can also further include reinforcing agents, preferably fibrous glass reinforcements, alone or in combination with non-glass reinforcing fillers. The fibrous glass is especially preferably fibrous glass filaments comprised of lime-aluminum borosilicate glass which is relatively soda free, known as "E" glass. However, other glasses can be used such as low soda glass or "C" glass. The filaments are made by standard processes, e.g., by steam or air blowing, flame blowing and mechanical pulling. The preferred filaments for plastics reinforcement can be made by mechanical pulling having filament diameters range from about 0.000112 to 0.00075 inch.

It is preferred to use sized filamentous glass reinforcement at from about 1 to about 80% by weight, based on the combined weight of glass and polymer and preferably, from about 10 to about 50% by weight. Especially preferable, is where glass comprises from about 10 to about 40% by weight, based on the combined weight of glass and resin. Generally, for direct molding use, up to about 50% of glass can be present without causing flow problems. However, it is useful also to prepare the compositions containing substantially greater quantities, e.g., up to 70 to 80% by weight of glass.

Other ingredients, such as stabilizers, pigments, plasticizers, antioxidants, and the like, can be added for their conventionally employed purposes.

An effective amount of the alkali metal sulfonate as used in the practice of the invention is that amount sufficient to provide from 0.2 to 10 parts of metal alkyl sulfonate, and preferably 0.2 to 3 parts, per 100 parts of polyphenylene oxide, while maintaining sufficient organothiophosphate to provide from 0.5% to 5% by weight of phosphorus based on the weight of thermoplastic molding composition.

The manner in which the present compositions are prepared is not critical and conventional methods can be employed. Preferably, however, each of the ingredients can be as part of a blend premix, and the latter passed through an extruder, e.g., a 28 mm. WP twin screw extruder, at an extrusion temperature of from about 500° to about 600° F., dependent on the needs of the particular composition. The strands emerging from the extruder can be cooled, chopped into pellets and molded to any desired shape.

In order to allow those skilled in the art to better practice the present invention, the following example is given by way of illustration and not by way of limitation. All parts are by weight.

EXAMPLE

Several moldable blends were prepared consisting of 50 parts polyphenylene oxide having an intrinsic viscosity of about 0.45 deciliters per gram (dl/g) as measured in chloroform about 30° C., 50 parts of Foster-Grant high impact polystyrene and 15 parts of one of several flame retardants. Each blend was then divided into two equal parts. Into one of the blend series was added 2% by weight Hostastat antistatic additive (a sodium $C_{12}$-$C_{18}$ alkyl sulfonate salt). The blends were separately added to a Henchel mixer and thoroughly mixed for 5 minutes. The respective mixtures were then extruded at 300° C. using a Werner and Pfleiderer extruder. The resin strands which were obtained were chopped into ⅛″ by ⅛″ pellets which were molded in a 5″×½″ bars in accordance with Underwriters Laboratories Bulletin No. 94 requiring a flame out time (FOT) of less than five seconds. The various blends were then molded at 250° C. and evaluated for flame retardancy.

The flame retardants used included K-50 of the FMC Corporation, or Kronitex-50 which is the product obtained by distilling the reaction product of $POCl_3$ and a mixture of isopropylphenol and phenol.

Stress cracking was determined by the following procedure:

There were molded ⅛″ by ⅛″ pellets into a 22″ by 7¾″ by 2″ tub with ⅛″ thick walls on an Engel 700 Ton molding machine at 525°-540° F. A total of five tubs were evaluated for each formulation. The tubs were placed in an oven at 170° F. for 24 hours to heat age the parts. After heat aging, the parts were examined for stress cracking. The total length of cracks in centimeters for each of the five parts were measured.

The stress cracking results were shown in the following Table, where the figures are in parts by weight:

| Polyphenylene Oxide | Polystyrene | Flame Retardant | Hostastat[b] Antistat | Extent of[c] Crack (cm) |
|---|---|---|---|---|
| 50 | 50 | 15 (Kronitex-50)[a] | None | 32.3 ± 8.8 |
| 50 | 50 | 15 | 2 | 24.7 ± 2.5 |

-continued

| Polyphenylene Oxide | Polystyrene | Flame Retardant | Hostastat[b] Antistat | Extent of[c] Crack (cm) |
|---|---|---|---|---|
| 50 | 50 | 15 (Kronitex-50)[a] (triphenylphosphate) | None | 38.8 ± 4.8 |
| 50 | 50 | 15 (triphenylphosphate) | 2 | 0.1 ± 0.1 |
| 50 | 50 | 15 (triphenylthiophosphate) | None | 8.4 ± 2.4 |
| 50 | 50 | 15 (triphenylthiophosphate) | 2 | 0.0 ± 0.0 |
| 55 | 45 | 15 (triphenylthiophosphate) | 2 | 0.0 ± 0.0 |

[a]TM of FMC Corporation
[b]Hostastat is a TM of American Hoechst Company for $C_{12}$ to $C_{18}$ Sodium Sulfonate.
[c]Extent of crack is the average total edge crack measured for five test samples.

The above results show that the molding compositions having the triphenylthiophosphate and alkali alkyl sulfonate exhibit the best stress cracking resistance as compared to the compositions of the prior art. It was further found that the polyphenylene oxide compositions containing the triphenylthiophosphate flame retardant exhibited superior UL-94 flame retardance and F.O.T. (sec) as compared to the prior art compositions.

Although the above example is directed to only a few of the very many variables which can be utilized in the practice of the present invention, it should be understood that the present invention is directed to a much broader variety of molding compositions, polyphenylene oxide and styrene resin utilizing triphenylthiophosphate and metal alkyl sulfonate salts to impart improved flame retardance and stress cracking resistance thereto.

What I claim as new and desire to secure by Letters Patent of the United States is:

1. Thermoplastic molding compositions comprising by weight
   (A) 100 parts of polyphenylene oxide
   (B) 20 to 300 parts of styrene resin,
   (C) an amount of organothiophosphate having the formula,

which is sufficient to provide from 0.5% to 5% by weight of phosphorous based on the weight of the thermoplastic molding composition and
   (D) 0.2 to 10 parts of metal alkyl sulfonate salt,
where $R^1$ is a $C_{(1-13)}$ monovalent hydrocarbon radical or substituted $C_{(1-13)}$ monovalent hydrocarbon radical, Q is a monovalent group selected from —$OR^1$ and

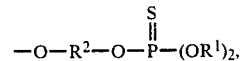

and $R^2$ is selected from divalent $C_{(2-20)}$ hydrocarbon radicals and substituted divalent $C_{(2-20)}$ hydrocarbon radicals.

2. A composition in accordance with claim 1, where the organothiophosphate is triphenylthiophosphate.

3. A composition in accordance with claim 1, where there is used a polyphenylene oxide-polystyrene blend.

4. A composition in accordance with claim 1, where there is used a polyphenylene oxide-polystyrene graft copolymer.

5. The composition in accordance with claim 1 where the metal alkyl sulfonate salt is an alkali metal alkylsulfonate salt.

* * * * *